United States Patent
Dawson et al.

(10) Patent No.: US 10,429,727 B2
(45) Date of Patent: Oct. 1, 2019

(54) MICROFACETED PROJECTION SCREEN

(71) Applicant: Sony Corporation, Tokyo (JP)

(72) Inventors: Thomas Dawson, Escondido, CA (US); Steven Richman, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/615,523

(22) Filed: Jun. 6, 2017

(65) Prior Publication Data

US 2018/0348622 A1 Dec. 6, 2018

(51) Int. Cl.
*G02B 26/00* (2006.01)
*G02B 26/08* (2006.01)
*G02F 1/29* (2006.01)
*G03B 21/60* (2014.01)

(52) U.S. Cl.
CPC .................. *G03B 21/60* (2013.01)

(58) Field of Classification Search
CPC ........... G02F 1/13336; G02F 1/133526; G02B 27/2214; G02B 27/10; G02B 3/005; G02B 26/0808; G02B 26/0816
USPC ................ 359/237, 242, 265–267, 270–273, 359/290–292, 298
See application file for complete search history.

(56) References Cited

U.S. PATENT DOCUMENTS

| | | | |
|---|---|---|---|
| 2,281,101 A | 4/1942 | Land | |
| 2,740,954 A | 4/1956 | Georges | |
| 3,510,197 A | 5/1970 | Seki et al. | |
| 3,961,839 A | 6/1976 | Brobst | |
| 5,111,337 A | 5/1992 | Martinez | |
| 5,218,472 A | 6/1993 | Jozefowicz et al. | |
| 5,361,164 A | 11/1994 | Steliga | |
| 5,530,571 A | 6/1996 | Chen | |
| 5,625,489 A | 4/1997 | Glenn | |
| 5,764,248 A | 6/1998 | Scarpetti | |
| 5,777,720 A | 7/1998 | Shapiro et al. | |
| 5,903,328 A | 5/1999 | Greene et al. | |
| 6,013,123 A | 1/2000 | Scarpetti | |
| 6,301,051 B1 | 10/2001 | Sankur | |
| 6,337,769 B1 | 1/2002 | Lee | |
| 6,529,322 B1 | 3/2003 | Jones et al. | |
| 6,530,664 B2 | 3/2003 | Vanderwerf et al. | |
| 6,842,282 B2 | 1/2005 | Kuroda et al. | |
| 6,892,949 B2 | 5/2005 | Mondie | |

(Continued)

FOREIGN PATENT DOCUMENTS

EP 0421809 A2 4/1991
GB 624772 A 6/1949

(Continued)

OTHER PUBLICATIONS

Thomas Dawson, Steven Richman, "Multichromic Reflective Layer to Enhance Screen Gain", related U.S. Appl. No. 15/656,495, Non-Final Office Action dated May 15, 2018.

(Continued)

*Primary Examiner* — Brandi N Thomas
(74) *Attorney, Agent, or Firm* — John L. Rogitz (57) ABSTRACT

To avoid requiring precise alignment between a projector and a projection screen, plural micro etched faceted grooves are provided for each area of the screen onto which a single pixel is to be projected. Each facet may be roughened, or gently curved, and the walls between adjoining facets likewise may be curved.

18 Claims, 8 Drawing Sheets

(56) References Cited

U.S. PATENT DOCUMENTS

| | | | |
|---|---|---|---|
| 7,072,108 | B2 | 7/2006 | Cruz-Uribe et al. |
| 7,130,118 | B2 | 10/2006 | Smythe et al. |
| 7,248,406 | B2 | 7/2007 | May et al. |
| 7,384,158 | B2 | 6/2008 | Ramachandran et al. |
| 7,480,096 | B2 | 1/2009 | May et al. |
| 7,535,636 | B2 | 5/2009 | Lippey et al. |
| 7,538,942 | B2 | 5/2009 | Odagiri et al. |
| 7,545,397 | B2 | 6/2009 | O'Dea et al. |
| 7,614,750 | B2 | 11/2009 | May et al. |
| 7,661,828 | B2 | 2/2010 | Allen et al. |
| 7,733,310 | B2 | 6/2010 | Hajjar et al. |
| 7,911,693 | B2 | 3/2011 | Smith et al. |
| 7,936,507 | B2 | 5/2011 | Sano et al. |
| 7,974,005 | B2 | 7/2011 | Huibers et al. |
| 8,081,368 | B2 | 12/2011 | Lippey |
| 8,218,236 | B2 | 7/2012 | Shiau et al. |
| 8,284,487 | B1 | 10/2012 | Liu |
| 8,411,983 | B2 | 4/2013 | Wei |
| 8,469,519 | B2 | 6/2013 | Marcus et al. |
| 8,649,090 | B2 | 2/2014 | Hosoi |
| 8,913,000 | B2 | 12/2014 | Erol et al. |
| 9,412,318 | B2 | 8/2016 | Chang |
| 9,640,143 | B1 | 5/2017 | Dawson et al. |
| 9,792,847 | B2 | 10/2017 | Dawson et al. |
| 2001/0035927 | A1* | 11/2001 | Sasagawa ............ G02B 6/0018 349/113 |
| 2003/0147053 | A1 | 8/2003 | Matsuda et al. |
| 2004/0257649 | A1 | 12/2004 | Heikkila et al. |
| 2005/0128581 | A1 | 6/2005 | Samuels et al. |
| 2006/0061860 | A1 | 3/2006 | Devos et al. |
| 2006/0209213 | A1 | 9/2006 | Baker |
| 2006/0228523 | A1 | 10/2006 | Cronin |
| 2006/0279839 | A1 | 12/2006 | May et al. |
| 2007/0014318 | A1 | 1/2007 | Hajjar et al. |
| 2007/0040989 | A1 | 2/2007 | Weng et al. |
| 2007/0133088 | A1 | 6/2007 | Lippey et al. |
| 2007/0177063 | A1 | 8/2007 | Hiramatsu |
| 2007/0211227 | A1* | 9/2007 | Era .................... G02B 27/2271 353/99 |
| 2008/0100564 | A1 | 5/2008 | Vincent et al. |
| 2008/0144172 | A1 | 6/2008 | Sano et al. |
| 2008/0239497 | A1 | 10/2008 | Lippey |
| 2008/0304014 | A1 | 12/2008 | Vaan |
| 2009/0086296 | A1 | 4/2009 | Renaud-Goud |
| 2009/0091718 | A1 | 4/2009 | Obi et al. |
| 2010/0097699 | A1* | 4/2010 | Destain ................ G03B 21/60 359/454 |
| 2010/0207956 | A1 | 8/2010 | Keh et al. |
| 2010/0245995 | A1 | 9/2010 | Graetz et al. |
| 2011/0019914 | A1 | 1/2011 | Bimber et al. |
| 2011/0075114 | A1 | 3/2011 | Tanis-Likkel et al. |
| 2011/0179734 | A1 | 7/2011 | Shaffer |
| 2012/0223879 | A1 | 9/2012 | Winter |
| 2013/0033530 | A1 | 2/2013 | Gamache et al. |
| 2014/0028594 | A1 | 1/2014 | Chen et al. |
| 2014/0104297 | A1 | 4/2014 | Yang |
| 2014/0168288 | A1 | 6/2014 | Tusch |
| 2014/0354698 | A1 | 12/2014 | Lee et al. |
| 2015/0077849 | A1 | 3/2015 | Sadahiro et al. |
| 2015/0138627 | A1 | 5/2015 | Ehrensperger et al. |
| 2015/0309316 | A1 | 10/2015 | Osterhout et al. |
| 2016/0088275 | A1 | 3/2016 | Fuchikami |
| 2016/0243773 | A1 | 8/2016 | Wang |
| 2016/0366379 | A1 | 12/2016 | Hickl |
| 2017/0032728 | A1 | 2/2017 | Shima et al. |
| 2017/0075207 | A1 | 3/2017 | Tao et al. |
| 2017/0269360 | A1 | 9/2017 | Yamaguchi et al. |

FOREIGN PATENT DOCUMENTS

| | | |
|---|---|---|
| JP | H09274159 A | 10/1997 |
| JP | 2002097730 A | 4/2002 |
| JP | 2008032925 A | 2/2008 |
| KR | 1020160103460 A | 9/2016 |

OTHER PUBLICATIONS

Thomas Dawson, Steven Richman, "Multichromic Reflective Layer to Enhance Screen Gain", related U.S. Appl. No. 15/656,495, Applicants response to Non-Final Office Action filed May 21, 2018.

"How to Setup a Projector Screen", Ebay, Mar. 13, 2016. Retrieved from http://www.ebay.com/gds/How-to-Set-Up-a-Projector-Screen-/10000000205290613/g.html.

"Team Develops new, inexpensive transparent projection screen (w/Video)", Phys.Org, Jan. 21, 2014.

"Viewall® Erasable Wall Material", Visual Planning 2015 Corporation, Sep. 15, 2016. Retrieved from http://www.visualplanning.com/boardswallmaterial2.html.

Steven Richman, Thomas Dawson, Frederick J. Zustak, "Tunable Lenticular Screen to Control Luminosity and Pixel-Based Contrast", file history of related U.S. Appl. No. 15/601,686, filed May 22, 2017.

Steven Richman, Thomas Dawson, Frederick J. Zustak, "Dual Layer EScreen to Compensate for Ambient Lighting", file history of related U.S. Appl. No. 15/601,758, filed May 22, 2017.

Thomas Dawson, Steven Richman, Frederick J. Zustak, "Transparent Glass of Polymer Window Pane as a Projector Screen", file history of related U.S. Appl. No. 15/602,796, filed May 23, 2017.

Steven Richman, Thomas Dawson, "Wallpaper-Based Lenticular Projection Screen", file history of related U.S. Appl. No. 15/608,667, filed May 30, 2017.

Steven Richman, Thomas Dawson, "Tile-Based Lenticular Projection Screen", file history of related U.S. Appl. No. 15/666,247, filed Aug. 1, 2017.

Thomas Dawson, Steven Richman, "Multichromic Filtering Layer to Enhance Screen Gain", file history of related U.S. Appl. No. 15/656,691, filed Jul. 21, 2017.

Thomas Dawson, Steven Richman, "Multichromic Reflective Layer to Enhance Screen Gain", file history of related U.S. Appl. No. 15/656,495, filed Jul. 21, 2017.

Steven Martin Richman, Thomas Dawson, Frederick J. Zustak, "Dual Layer EScreen to Compensate for Ambient Lighting", related U.S. Appl. No. 15/601,758, Non-Final Office Action dated Jan. 19, 2018.

Steven Martin Richman, Thomas Dawson, Frederick J. Zustak, "Dual Layer EScreen to Compensate for Ambient Lighting", related U.S. Appl. No. 15/601,758, Applicant's response to Non-Final Office Action filed Jan. 23, 2018.

Thomas Dawson, Steven Richman, "Multichromic Reflective Layer to Enhance Screen Gain", related U.S. Appl. No. 15/656,495, Final Office Action dated Jan. 30, 2018.

Thomas Dawson, Steven Richman, "Multichromic Reflective Layer to Enhance Screen Gain", related U.S. Appl. No. 15/656,495, Applicant's response to Final Office Action filed Feb. 1, 2018.

Thomas Dawson, Steven Richman, "Multichromic Filtering Layer to Enhance Screen Gain", related U.S. Appl. No. 15/656,691, Final Office Action dated Jan. 30, 2018.

Thomas Dawson, Steven Richman, "Multichromic Filtering Layer to Enhance Screen Gain", related U.S. Appl. No. 15/656,691, Applicant's response to Final Office Action filed Feb. 1, 2018.

Thomas Dawson, Steven Richman, "Multichromic Reflective Layer to Enhance Screen Gain", related U.S. Appl. No. 15/656,495, Applicants response to Final Office Action filed Aug. 8, 2018.

Thomas Dawson, Steven Richman, "Multichromic Filtering Layer to Enhance Screen Gain", related U.S. Appl. No. 15/656,691, Applicant's response to Final Office Action filed Aug. 8, 2018.

Thomas Dawson, Steven Richman, "Multichromic Reflective Layer to Enhance Screen Gain", related U.S. Appl. No. 15/656,495, Final Office Action dated Jul. 24, 2018.

Thomas Dawson, Steven Richman, "Multichromic Filtering Layer to Enhance Screen Gain", related U.S. Appl. No. 15/656,691, Final Office Action dated Jul. 26, 2018.

Steven Richman, Thomas Dawson, Frederick J. Zustak, "Tunable Lenticular Screen to Control Luminosity and Pixel-Based Contrast", related U.S. Appl. No. 15/601,686, Non-Final Office Action dated Jun. 18, 2018.

(56) References Cited

OTHER PUBLICATIONS

Steven Richman, Thomas Dawson, Frederick J. Zustak, "Tunable Lenticular Screen to Control Luminosity and Pixel-Based Contrast", related U.S. Appl. No. 15/601,686, Applicant's response to Non-Final Office Action filed Jun. 20, 2018.
Thomas Dawson, Steven Richman, "Multichromic Filtering Layer to Enhance Screen Gain", related U.S. Appl. No. 15/656,691, Non-Final Office Action dated Jun. 12, 2018.
Thomas Dawson, Steven Richman, "Multichromic Filtering Layer to Enhance Screen Gain", related U.S. Appl. No. 15/656,691, Applicant's response to Non-Final Office Action filed Jun. 14, 2018.
Thomas Dawson, Steven Richman, "Multichromic Reflective Layer to Enhance Screen Gain", related U.S. Appl. No. 15/656,495, Examiners Answer dated Oct. 17, 2018.
Thomas Dawson, Steven Richman, "Multichromic Reflective Layer to Enhance Screen Gain", related U.S. Appl. No. 15/656,495, Reply Brief filed Oct. 24, 2018.
Thomas Dawson, Steven Richman, "Multichromic Filtering Layer to Enhance Screen Gain", related U.S. Appl. No. 15/656,691, Non-Final Office Action dated Dec. 13, 2018.
Thomas Dawson, Steven Richman, "Multichromic Filtering Layer to Enhance Screen Gain", related U.S. Appl. No. 15/656,691, Applicant's response to Non-Final Office Action filed Dec. 17, 2018.
Steven Richman, Thomas Dawson, "Tile-Based Lenticular Projection Screen", related U.S. Appl. No. 15/666,247, Non-Final Office Action dated May 3, 2019.
Steven Richman, Thomas Dawson, "Tile-Based Lenticular Projection Screen", related U.S. Appl. No. 15/666,247, Applicant's response to Non-Final Office Action filed May 8, 2019.
Steven Richman, Thomas Dawson, "Wallpaper-Based Lenticular Projection Screen", related U.S. Appl. No. 15/608,667, Applicant's response to Final Office Action filed Apr. 23, 2019.
Thomas Dawson, Steven Richman, "Multichromic Filtering Layer to Enhance Screen Gain", related U.S. Appl. No. 15/656,691, Applicant's Reply Brief in response to the Examiner's Answer filed Apr. 23, 2019.
Thomas Dawson, Steven Richman, Frederick J. Zustak, "Transparent Glass of Polymer Window Pane as a Projector Screen", related U.S. Appl. No. 15/602,796, Non-Final Office Action dated Jan. 28, 2019.
Thomas Dawson, Steven Richman, Frederick J. Zustak, "Transparent Glass of Polymer Window Pane as a Projector Screen", related U.S. Appl. No. 15/602,796, Applicant's response to Non-Final Office Action filed Feb. 5, 2019.
Thomas Dawson, Steven Richman, "Multichromic Filtering Layer to Enhance Screen Gain", related U.S. Appl. No. 15/656,691, Final Office Action dated Feb. 7, 2019.
Steven Richman, Thomas Dawson, "Wallpaper-Based Lenticular Projection Screen", related U.S. Appl. No. 15/608,667, Non-Final Office Action dated Mar. 7, 2019.
Steven Richman, Thomas Dawson, "Wallpaper-Based Lenticular Projection Screen", related U.S. Appl. No. 15/608,667, Applicant's response to Non-Final Office Action filed Mar. 11, 2019.
Steven Richman, Thomas Dawson, "Wallpaper-Based Lenticular Projection Screen", related U.S. Appl. No. 15/608,667, Final Office Action dated Apr. 8, 2019.
Thomas Dawson, Steven Richman, "Multichromic Filtering Layer to Enhance Screen Gain", related U.S. Appl. No. 15/656,691, Examiner's Answer dated Apr. 8, 2019.
Steven Richman, Thomas Dawson, "Wallpaper-Based Lenticular Projection Screen", related U.S. Appl. No. 15/608,667, Non-Final Office Action dated Jun. 14, 2019.
Thomas Dawson, Steven Richman, "Microfaceted Projection Screen", related U.S. Appl. No. 15/615,523, Applicant's response to Non-Final Office Action filed Jun. 12, 2019.

* cited by examiner

MICROFACETED PROJECTION SCREEN

FIELD

The application relates generally to projection screens for short throw projectors.

BACKGROUND

With some video projectors, and especially short throw projectors, much of the projected light ends up being reflected toward the ceiling from the projection screen.

SUMMARY

A projection screen is formed with micro-facets that reflect light from a projector toward the viewers of the screen without the need for lenticular lenses to do this.

In an aspect, an apparatus includes a projection screen onto which pixels from a projector are to be projected. Each pixel from the projector corresponds to a small area on the projection screen, which may be referred to as a "pixel area". Within each of the pixel areas, plural micro grooves are on the projection screen reflect the light toward the viewer.

Each pixel from the projector corresponds to a respective pixel area on the projection screen. In each of at least plural of the pixel areas, plural micro grooves are formed on the projection screen.

In some examples, plural micro grooves are formed in each of at least ninety percent of the pixel areas. Plural micro grooves may be formed in each of all of the pixel areas.

Thus, in some examples a set of micro grooves is formed, with each micro groove containing a set of faceted features in which the vertical and horizontal orientation of each individual facet are aligned to reflect light from a projector toward the expected position of a viewer of the screen. The orientation angles in both the vertical and horizontal directions may vary for each facet to accommodate the changing angle of the light from the projector across the projection screen. The facet orientation angles thus may not be equal between facets because their relative position to the projector will be different. Note further that for each facet, the height and width of the facet may change across the surface of the projection screen.

In example embodiments, in at least a first pixel area of the plural pixel areas, at least first and second micro grooves are formed. The first micro groove is above the second micro groove, and the first micro groove defines a first angle with respect to vertical. The second micro groove also defines a second angle with respect to vertical, and the first and second angles are not equal.

In non-limiting implementations, in at least a first pixel area of the plural pixel areas, at least first and second micro grooves are formed. The first micro groove is above the second micro groove and defines a first angle with respect to horizontal. The second micro groove defines a second angle with respect to horizontal, and the first and second angles are not equal.

In examples, in at least a first pixel area of the plural pixel areas, at least first and second micro grooves are formed, and at least the first micro groove being formed with a roughened surface.

In some embodiments, in at least a first pixel area of the plural pixel areas, at least first and second micro grooves are formed, and at least the first micro groove is formed with a curvilinear surface.

If desired, in at least a first pixel area of the plural pixel areas, at least first and second micro grooves can be formed. A connecting wall between facets may be formed with a curvilinear surface.

In another aspect, an assembly includes a projection screen and a projector projecting video pixels onto respective pixel areas on the projection screen. At least one pixel area includes plural grooves that are parallel to each other.

In another aspect, a method includes forming a projection screen with plural micro grooves, and providing a projector for projecting video pixels onto the projection screen. Each one of at least some of the pixels is projected onto plural micro grooves when the projector projects images onto the screen.

The details of the present application, both as to its structure and operation, can best be understood in reference to the accompanying drawings, in which like reference numerals refer to like parts, and in which:

DETAILED DESCRIPTION

This disclosure relates generally to computer ecosystems including aspects of consumer electronics (CE) device networks such as projector systems. A system herein may include server and client components, connected over a network such that data may be exchanged between the client and server components. The client components may include one or more computing devices including video projectors and projector screens, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony Playstation (trademarked), a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with one or more general purpose processors, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hardwired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Figure 1:
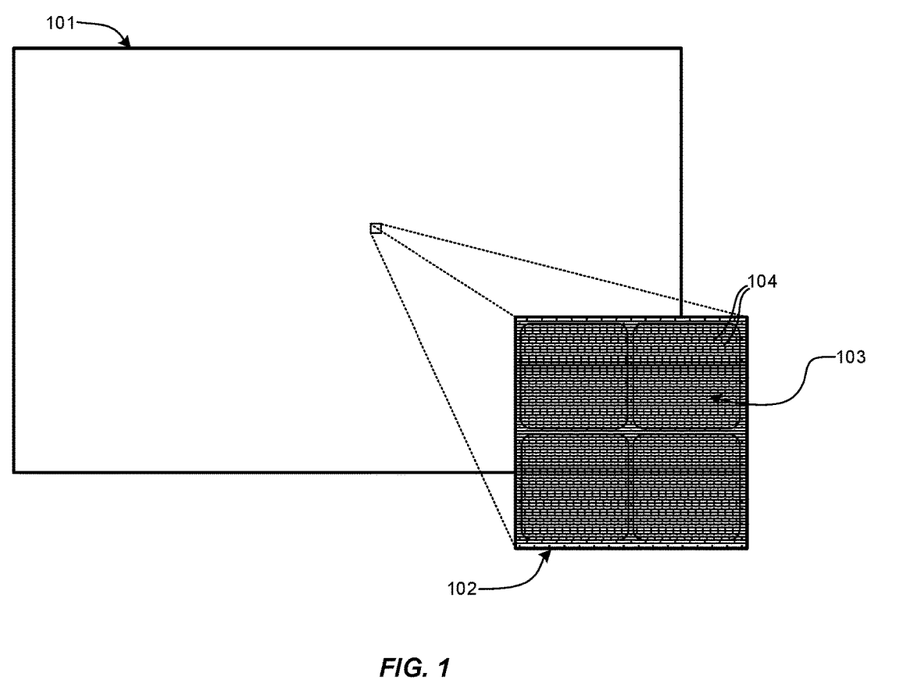
FIG. 1 is a schematic diagram showing a projection screen consistent with present principles, illustrating micro facets from four projection pixel areas in a magnified view.

Now referring to FIG. 1, a micro groove projection screen 101 is shown, the grooves of which may be established by etching or other appropriate process. As shown by the zoomed in portion 102, showing an example of the micro groove size relative to the size of the areas 103 (four shown) of the screen 101 onto each one of which is projected a single pixel from a projector such as a short throw projector, each projected pixel covers an area of the display 101 with a large number of micro etched grooves 104. This reduces or eliminates the need for a precise alignment between the projection screen and the projector. The number of grooves 104 is greater than one per pixel and may be between four and sixteen grooves per pixel area, although other numbers may be used.

Thus, the projection screen 101 onto which pixels from a projector are to be projected has pixel areas 103, with each pixel from the projector corresponding to a respective pixel area 103 on the projection screen in a one-to-one relationship. In each of at least plural of the pixel areas 103, plural micro grooves 104 are formed on the projection screen.

In some examples, plural micro grooves are formed in each of at least ninety percent of the pixel areas. Plural micro grooves may be formed in each of all of the pixel areas 103. Note that as shown in FIG. 1, the grooves 104 are parallel to each other.

The grooves 104 may be created through a process such as laser micro ablation. In addition, alternate manufacturing methods include mechanical press (similar to what's been used for music CDs) and nano-scale 3D printing. These techniques may be used in combination where a metal master made by laser ablation is used to press the micro faceted groove pattern onto another material. For various press methods, a negative image of the faceted micro grooved surface is created such that when pressed into a material it result in a positive version being imparted to the material being pressed. The press methods include a flat plate press and a roll press where material is passed under a large roller which has several copies of the negative master. As the material passed through the roll press the faced groove pattern is imparted to it.

Figure 2:
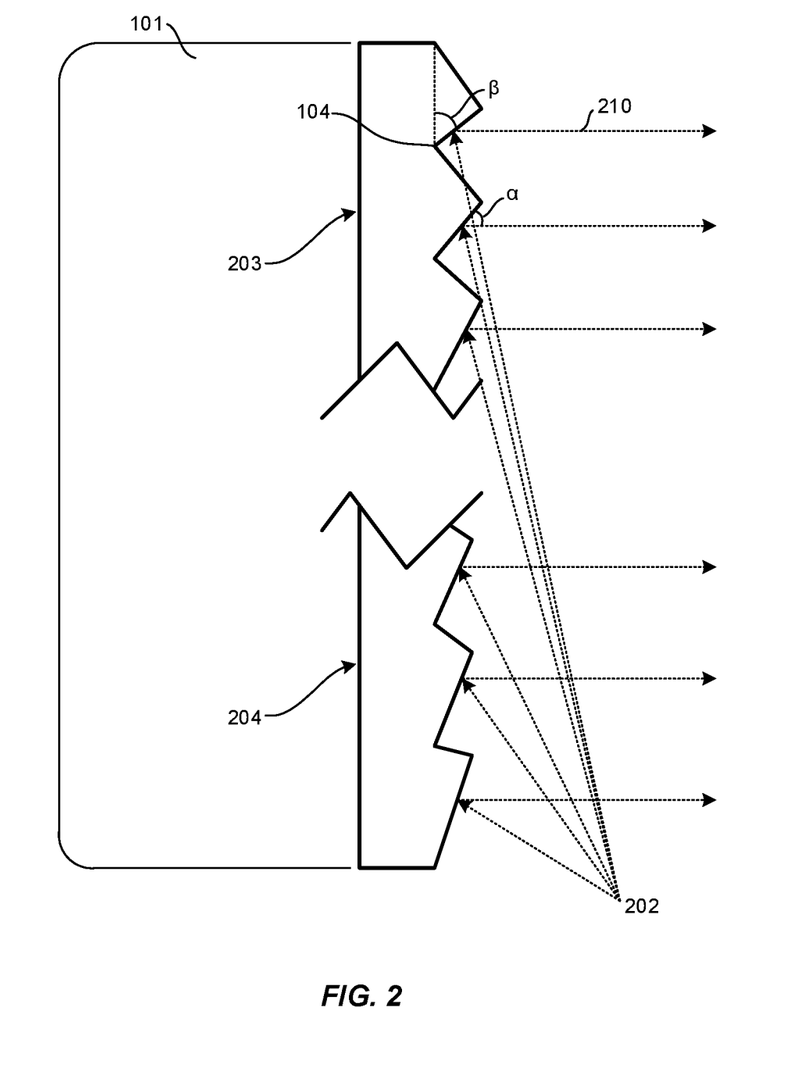
FIG. 2 is a side view of part of the screen of FIG. 1.

Turning to FIG. 2, showing a side view of part of the screen 101, the etched grooves 104 may be controlled on a row by row basis to have differing angles to ensure even and directed brightness of the light 202 reflected to the viewer from, e.g., a short throw projector. The angle of the light from the projector with respect to the screen 101 varies evenly between a top portion 203 of the projection screen and a bottom portion 204 of the projection screen. The angles of the facets of the grooves 104 vary accordingly row by row to accommodate the differing angles of incidence from the projector. In FIG. 2 the size of the grooves and the angles are exaggerated for purposes of illustration of the accommodation of the angle of light from the short throw projector.

Thus, as shown in FIG. 2, in at least a first pixel area of the plural pixel areas 103 shown in FIG. 1, at least first and second micro grooves are formed, with the first micro groove being above the second micro groove. The first micro groove defines a first angle $\beta$ with respect to horizontal 210, and the second micro groove defines a second angle $\alpha$ with respect to horizontal, with the first and second angles not being equal. The second (lower) angle may be less acute than the first (higher) angle.

Figure 3:
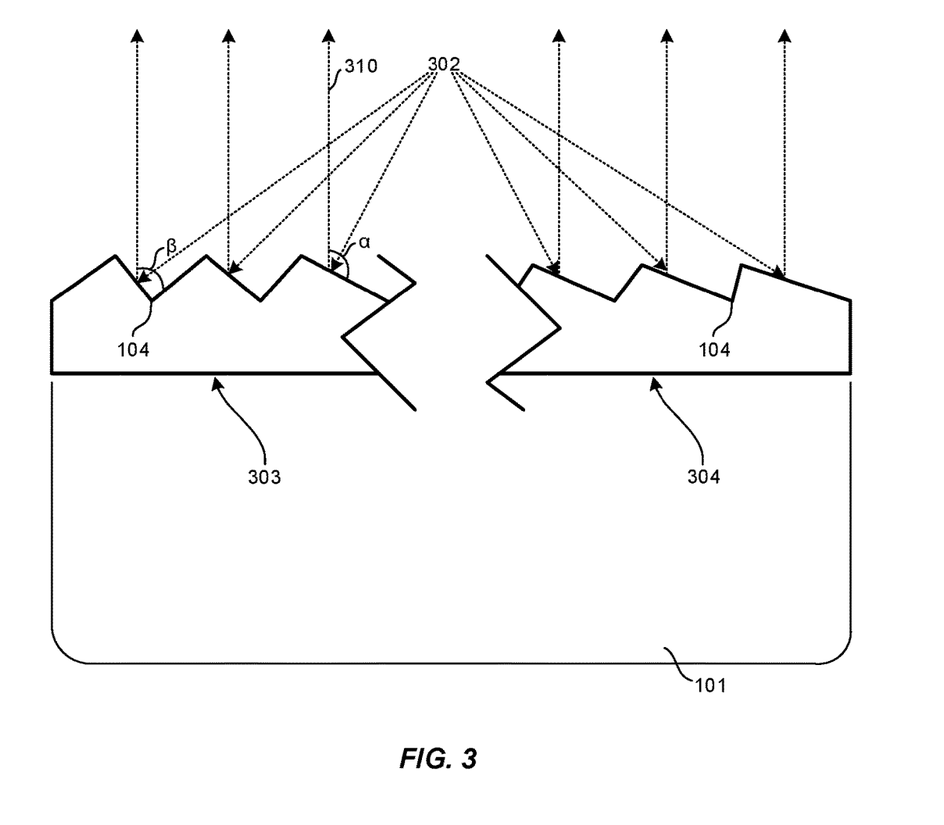
FIG. 3 is a top view of part of the screen of FIG. 1.

FIG. 3 shows a top view of a projection screen 101, showing how the surface within each of the etched grooves 104 may be further micro faceted to ensure even brightness of the light 302 reflected from a projector such as a short throw projector. The angle of the light from the projector, particularly a short throw projector, can vary between the left side 304 and right side 303 of the screen. Note that the left side 304 and right side 303 designations are from the viewpoint of looking at the projection screen from the front. There is a gradual change of the angles of facets between successive grooves 104 between the left side 304 and the right side 303 of the screen to accommodate the changing angle of the light 302 from the projector.

Thus, as shown in FIG. 3, in at least a first pixel area 103 of the plural pixel areas, at least first and second micro grooves are formed, the first micro groove being adjacent the second micro groove. The first micro groove defines a first angle α with respect to the normal 310 to the screen surface, with the second micro groove defining a second angle β with respect to the normal, and with the first and second angles not being equal. For example, the laterally inboard angle (in the example shown, α) can be less acute than the laterally outboard angle (in the example shown, β).

Figure 4:
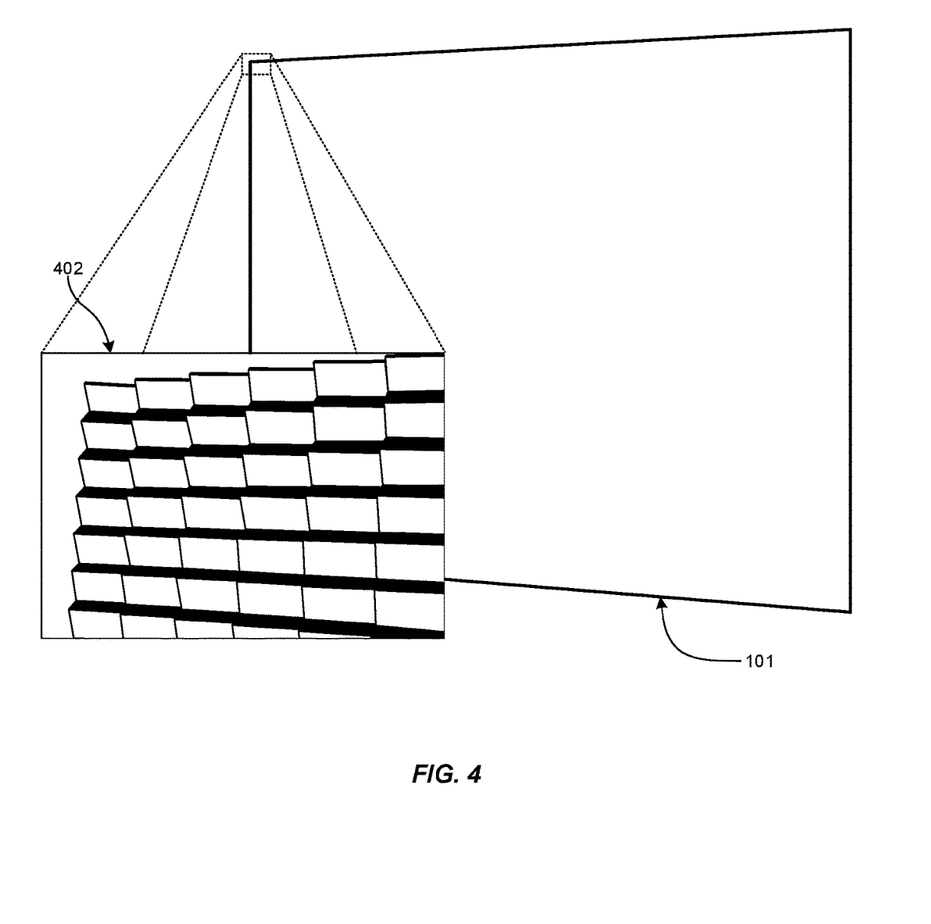
FIG. 4 is a schematic diagram similar to FIG. 1, illustrating in magnification individual facets of a corner of the screen.

FIG. 4 illustrates the two-dimensional faceting described above in reference to FIGS. 2 and 3. An example close up view 402 of a small section of the upper left corner of the projection screen 101 illustrates how the individual facets created with the micro grooves direct light from the short throw projector along both the vertical and horizontal axis.

Figure 5:
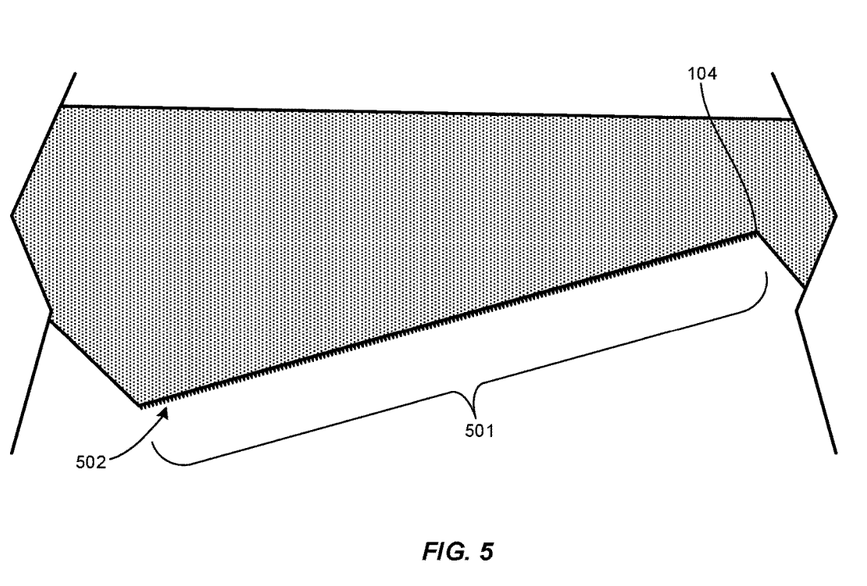
FIG. 5 is a schematic view of a single facet with a roughened surface.

FIG. 5 shows a single micro groove 104 in which a micro facet 501 within each groove may optionally have a microscopically rough surface 502 to provide light scattering to increase the field of view. The roughness is at a very small scale relative to the facet size. The roughness may be created through the manufacturing process or by a coating applied to the surface to provide photon scattering. Alternatively, the facet surface may be kept smooth and/or polished to maximize light being reflected toward a selected area where the viewer is expected to be. Variations between these extremes are also possible. An additional surface coating may be applied over the finished projection screen as a protectant for when the projection screen is cleaned. The index of refraction for the protective coating may be made to be close to the index of refraction for regular air.

Figure 6:
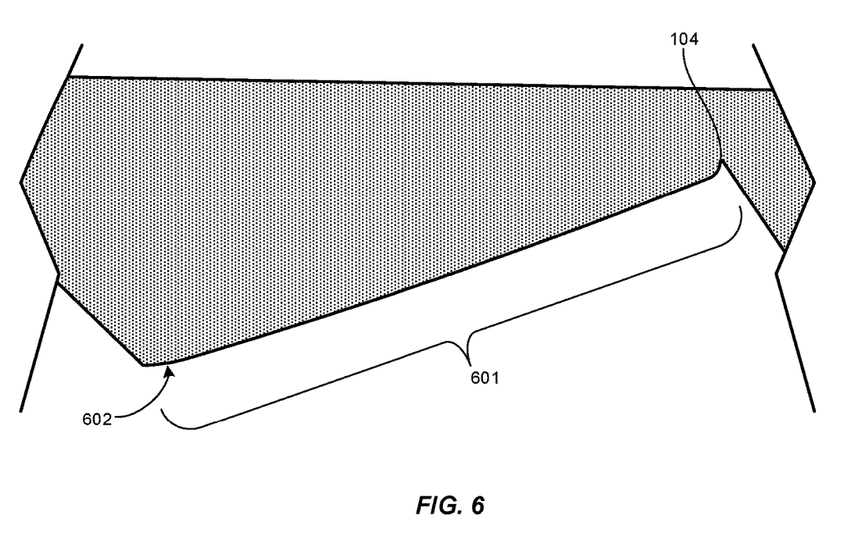
FIG. 6 is a schematic view of a single facet with a gently curved, non-linear surface.

FIG. 6 shows a single micro groove 104 with a corresponding facet 601 that can be formed with a slight outward bulge 602 relative to the center of the facet in order to widen the viewing angle of the projection screen. This can optionally be combined with the surface roughness method shown in FIG. 5. Thus, a micro groove can be formed with a curvilinear surface.

Figure 7:
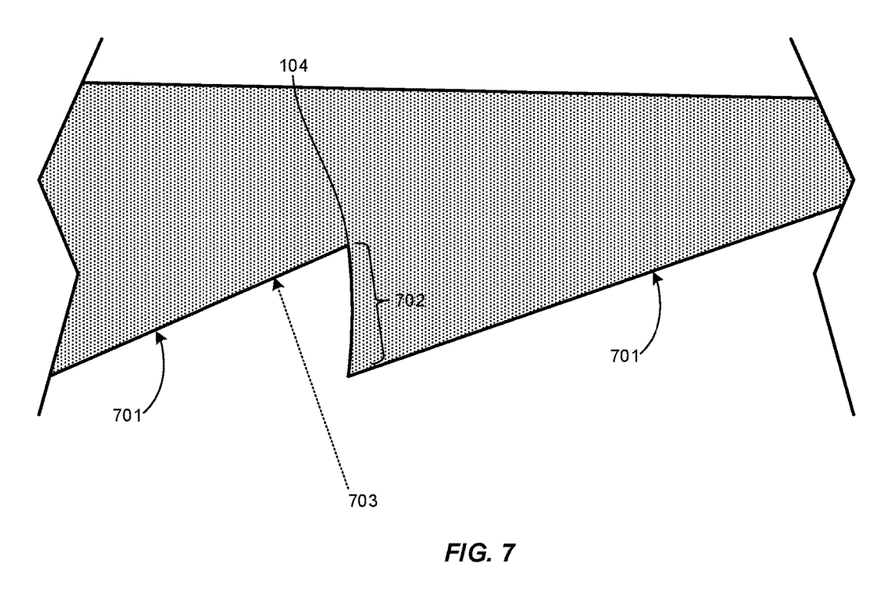
FIG. 7 is a schematic view of two facets with a gently curved, non-linear wall between them.

FIG. 7 shows a single micro groove 104 with a facet 701 and an opposite wall 702 extending from the groove 104 to the facet 701 of an adjacent groove. As shown, the wall 702 has a curvilinear surface such as a concave bend and/or is constructed at an angle to ensure that it will not interact with the light 703 from the projector.

Now specifically referring to FIG. 8, an example ecosystem 10 is shown, which may include one or more of the example devices mentioned above and described further below in accordance with present principles. The first of the example devices included in the system 10 is a projection screen assembly 12. The projection screen assembly 12 can be established by some or all of the components shown in FIG. 8 and may any of the micro groove screens described previously. The projection screen assembly 12 may include an active display or screen in that it contains addressable screen elements that establish screen pixels and that can be controlled to establish grayscale values. Or, the assembly 12 may be a passive screen. When implemented by an active screen for, e.g., establishing grayscale values on the screen itself in coordination with color light projected onto the screen from the projector, the techniques described in the present assignee's U.S. Pat. No. 9,640,143, incorporated herein by reference, may be used.

The projection screen assembly 12 can include one or more microfaceted screens or displays 14. The projection screen assembly 12 may also include one or more speakers 16 for outputting audio in accordance with present principles.

For active screen assemblies, the assembly can include at least one input device 18 such as e.g. an audio receiver/microphone or key pad or control keys for e.g. entering commands to at least one screen processor 20. An example active screen assembly 12 may also include one or more network interfaces 22 for communication over at least one network 24 such as the Internet, an WAN, an LAN, etc. under control of the one or more processors 20. Thus, the interface 22 may be, without limitation, a Wi-Fi transceiver, which is an example of a wireless computer network interface, such as but not limited to a mesh network transceiver, or it may be a Bluetooth or wireless telephony transceiver. It is to be understood that the processor 20 may control the screen assembly 12. Furthermore, note the network interface 22 may be, e.g., a wired or wireless modem or router, or other appropriate interface such as, e.g., a wireless telephony transceiver, or Wi-Fi transceiver as mentioned above, etc.

In addition to the foregoing, an active screen assembly 12 may also include one or more input ports 26 such as, e.g., a high definition multimedia interface (HDMI) port or a USB port to physically connect (e.g. using a wired connection) to another CE device and/or a headphone port to connect headphones to the screen assembly 12 for presentation of audio from the screen assembly 12 to a user through the headphones. For example, the input port 26 (and/or network interface 22) may be connected via wire or wirelessly via the network 24 to a cable or satellite or other audio video source 28 with associated source processor 28A and source computer memory 28B. Thus, the source may be, e.g., a separate or integrated set top box, or a satellite receiver. Or, the source 28 may be a game console or personal computer or laptop computer or disk player. Yet again, the source 28 and/or the color video source discussed below may be cloud servers on the Internet, and may include and perform "cloud" functions such that the devices of the system 10 may access a "cloud" environment via the server 28 in example embodiments. Or, the server 28 may be implemented by a game console or other computer in the same room as the other devices shown in FIG. 5 or nearby.

An active screen assembly 12 may further include one or more computer memories 30 such as disk-based or solid state storage that are not transitory signals, in some cases embodied in the chassis of the screen as standalone devices or as a personal video recording device (PVR) or video disk player either internal or external to the chassis of the AVDD for playing back AV programs or as removable memory media.

Figure 8:
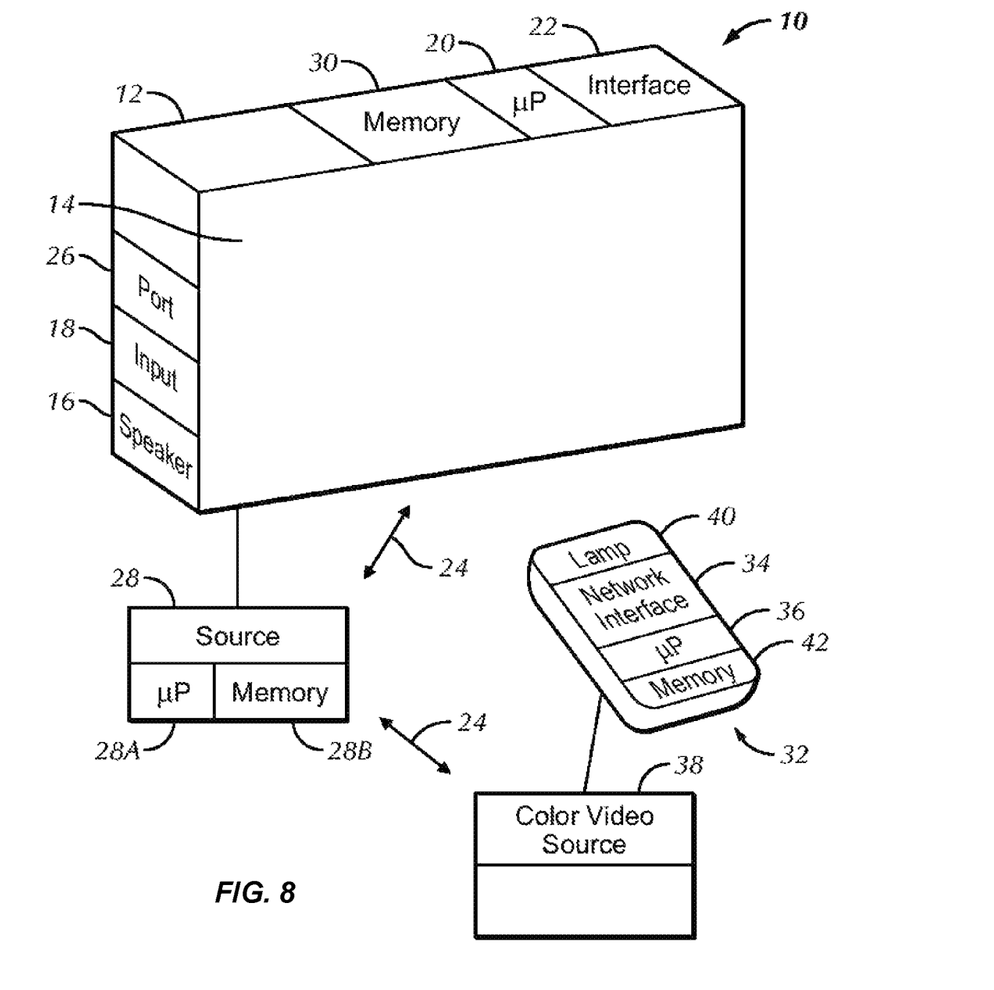
FIG. 8 is a block diagram of an example system including an example in accordance with present principles.

Still referring to FIG. 8, in addition to the AVDD 12, the system 10 may include one or more other device types. When the system 10 is a home network, communication between components may be according to the digital living network alliance (DLNA) protocol. Or, the projector and screen can be used in a public movie theater.

In one example, a front projector 32 such as but not limited to a Sony ultra short throw (UST) projector may be used to project demanded images onto the front of the display 14. The example projector 32 may include one or more network interfaces 34 for communication over the network 24 under control of one or more projector processors 36. Thus, the interface 34 may be, without limitation, a Wi-Fi transceiver, which is an example of a wireless computer network interface, including mesh network interfaces, or a Bluetooth transceiver, or a wireless telephony transceiver.

It is to be understood that the projector processor 36 controls the projector 32 to undertake present principles. In this regard, the projector processor 36 may receive signals representing demanded color images from a color video source 38 which may be the same as or different from the video source 28 described previously and which may be established by any one or more of the source types described previously.

The projector processor 36 controls a lamp assembly 40 to project color light onto the screen assembly 12. The lamp assembly may be a laser lamp assembly or other type of color illuminator assembly. The projector may further include one or more computer memories 42 such as disk-based or solid state storage.

As shown in FIG. 8, the screen 12 may be mounted on a substrate 44 such as but not limited to a wall or window.

The above methods may be implemented as software instructions executed by a processor, including suitably configured application specific integrated circuits (ASIC) or field programmable gate array (FPGA) modules, or any other convenient manner as would be appreciated by those skilled in those art. Where employed, the software instructions may be embodied in a device such as a CD Rom or Flash drive or any of the above non-limiting examples of computer memories that are not transitory signals. The software code instructions may alternatively be embodied in a transitory arrangement such as a radio or optical signal, or via a download over the internet.

It will be appreciated that whilst present principals have been described with reference to some example embodiments, these are not intended to be limiting, and that various alternative arrangements may be used to implement the subject matter claimed herein.

What is claimed is:

1. Apparatus comprising:
   a projection screen onto which pixels from a projector are to be projected, each pixel from the projector corresponding to a respective pixel area on the projection screen; and
   in each of at least plural of the pixel areas, four to sixteen, inclusive elongated parallel micro grooves formed on the projection screen, wherein in at least a first pixel area of the plural pixel areas, at least first and second micro grooves are formed, the first micro groove being adjacent the second micro groove, the first micro groove defining a first angle with respect to a normal to the projection screen, the second micro groove defining a second angle with respect to a normal to the projection screen, the first and second angles not being equal, the micro grooves being arranged in rows, the angles defined by the micro grooves varying both row by row and left to right across a row.

2. The apparatus of claim 1, wherein plural micro grooves are formed in each of at least ninety percent of the pixel areas.

3. The apparatus of claim 1, wherein plural micro grooves are formed in each of all of the pixel areas.

4. The apparatus of claim 1, wherein in at least a first pixel area of the plural pixel areas, at least first and second micro grooves are formed, the first micro groove being above the second micro groove, the first micro groove defining a first angle with respect to horizontal, the second micro groove defining a second angle with respect to horizontal, the first and second angles not being equal such that at least some of the micro grooves have two-dimensional faceting.

5. The apparatus of claim 1, wherein in at least a first pixel area of the plural pixel areas, at least first and second micro grooves are formed, at least an interior of the first micro groove being formed with a roughened surface.

6. The apparatus of claim 1, wherein in at least a first pixel area of the plural pixel areas, at least first and second micro grooves are formed, at least the first micro groove being formed with a curvilinear surface.

7. The apparatus of claim 1, wherein in at least a first pixel area of the plural pixel areas, at least first and second micro grooves are formed, a wall connecting the first and second micro grooves, the wall being formed with a curvilinear surface.

8. The apparatus of claim 1, comprising the projector.

9. An assembly, comprising:
   at least one projection screen; and
   at least one projector projecting video pixels onto respective pixel areas on the projection screen, wherein at least one pixel area comprises plural elongated grooves parallel to each other, wherein in at least a first pixel area of the plural pixel areas, at least first and second grooves are formed, the first groove being above the second groove, at least the first groove defining a concave surface.

10. The assembly of claim 9, wherein plural grooves are formed in each of at least ninety percent of the pixel areas.

11. The assembly of claim 9, wherein plural grooves are formed in each of all of the pixel areas.

12. The assembly of claim 9, wherein in at least a first pixel area of the plural pixel areas, at least first and second micro grooves are formed, the first micro groove being adjacent the second micro groove, the first micro groove defining a first angle with respect to a normal to the projection screen, the second micro groove defining a second angle with respect to a normal to the projection screen, the first and second angles not being equal.

13. The assembly of claim 9, wherein in at least a first pixel area of the plural pixel areas, at least first and second grooves are formed, at least an interior of the first groove being formed with a roughened surface.

14. The assembly of claim 9, wherein in at least a first pixel area of the plural pixel areas, at least first and second grooves are formed, at least the first groove being formed with a curvilinear surface.

15. The assembly of claim 9, wherein in at least a first pixel area of the plural pixel areas, at least first and second grooves are formed, a wall connecting the first and second grooves, the wall being formed with a curvilinear surface.

16. A method, comprising:
   forming a projection screen with plural elongated micro grooves; and
   providing a projector for projecting video pixels onto the projection screen, each one of at least some of the pixels being projected onto plural micro grooves when the projector projects images onto the screen, the micro grooves varying in angle horizontal row by horizontal row across the projection screen.

17. The method of claim 16, comprising:
   in at least a first pixel area of the plural pixel areas, forming at least first and second micro grooves, the first micro groove being above the second micro groove, the first micro groove defining a first angle with respect to vertical, the second micro groove defining a second angle with respect to vertical, the first and second angles not being equal.

18. The method of claim 16, comprising:

in at least a first pixel area of the plural pixel areas, forming at least first and second micro grooves, the first micro groove being above the second micro groove, the first micro groove defining a first angle with respect to horizontal, the second micro groove defining a second angle with respect to horizontal, the first and second angles not being equal.

\* \* \* \* \*